Nov. 7, 1961  K. J. DAVIS  3,007,563
GEAR CONVEYOR SYSTEM
Filed Feb. 25, 1958  2 Sheets-Sheet 1
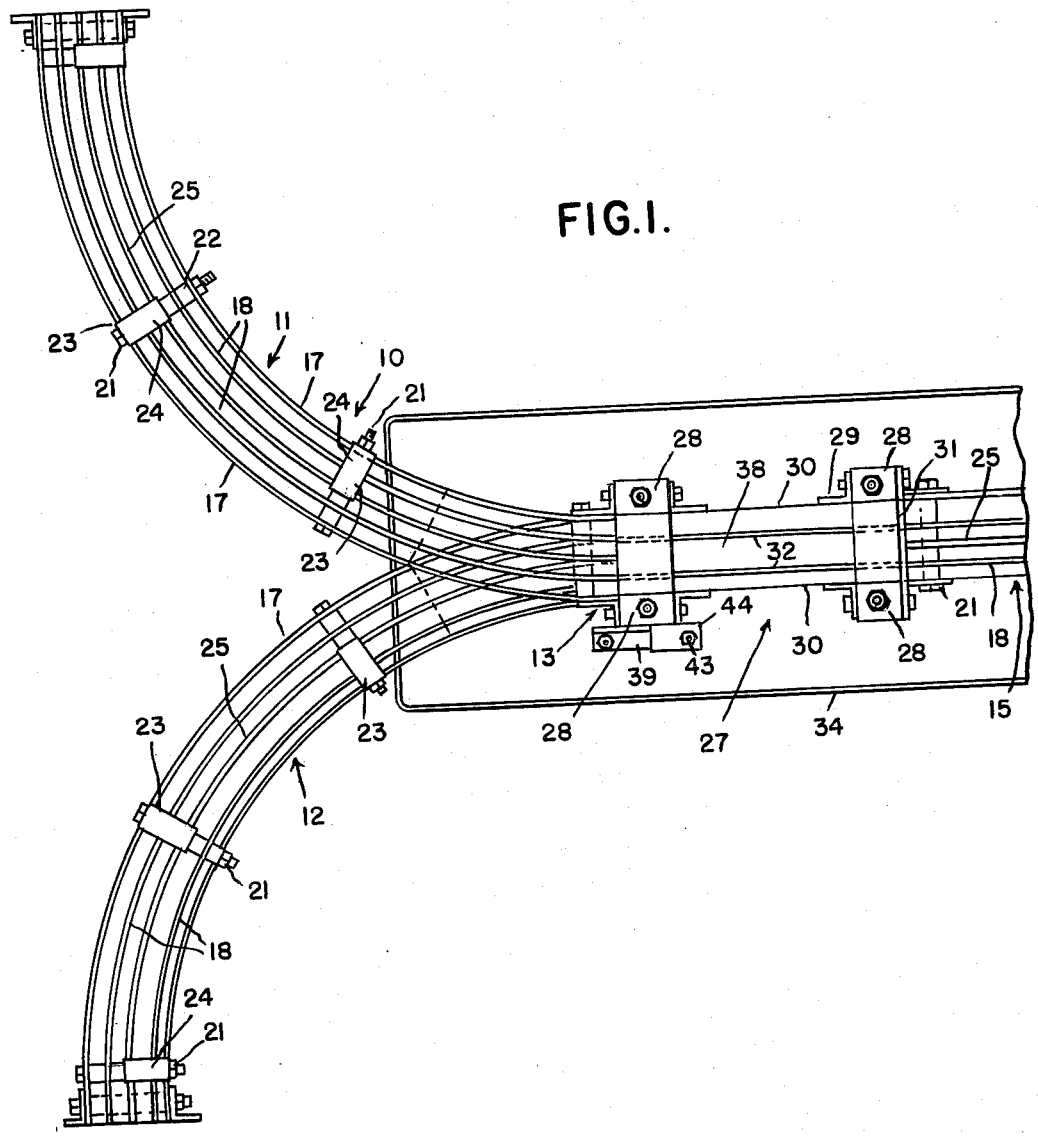
FIG.I.
INVENTOR.
KENNETH J. DAVIS
BY *Whittemore, Hulbert & Belknap*
ATTORNEYS

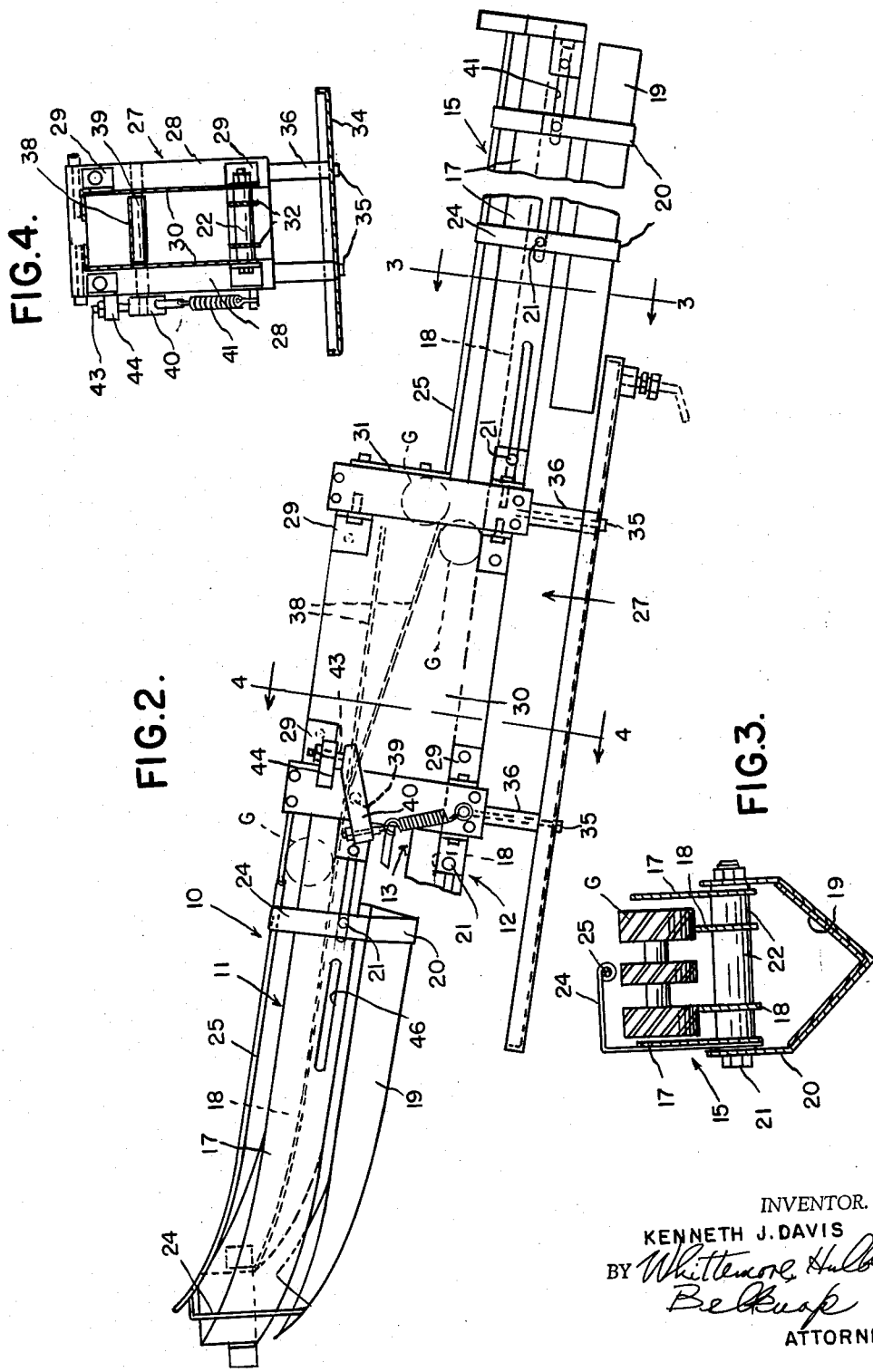

United States Patent Office 3,007,563
Patented Nov. 7, 1961

3,007,563
GEAR CONVEYOR SYSTEM
Kenneth J. Davis, Detroit, Mich., assignor to National Broach & Machine Company, Detroit, Mich., a corporation of Michigan
Filed Feb. 25, 1958, Ser. No. 717,392
2 Claims. (Cl. 193—39)

The present invention relates to a system for conveying gears or similar objects in a factory and in particular to a gravity type conveyor for bringing onto a single receiving track or chute gears from two separate and convergent gravity feed tracks or chutes which discharge in vertically spaced planes. The improvement of the invention insures that the transfer from the dual feed tracks is a controlled one accomplished without interference and destructive jamming of the gears at the point of merger of the feed conveyors.

It is an object of the invention to provide an exceedingly simple gravity system of this sort, comprising first and second incoming tracks converging to a common discharge zone, at which the discharge end of the first track is located directly above that of the second, each track having a continuous way or rails along which the gears roll or slide; and in which a transfer or control section is provided between these incoming tracks and a common receiving track, including a pivoted, spring biased ramp at the discharge end of the upper track along which gears move downwardly to the receiving track.

Another object is to provide a conveyor of this sort in which the ramp of the intermediate transfer section, in the downward position to which it is weighed by a gear passing thereover, prevents movement of a gear from the lower incoming track onto the single receiving track.

Another object is to provide a conveyor including a pivotally movable, spring biased ramp as described, in which a simple cross stop holds a gear on the ramp in the event a gear is present beneath the ramp on a lower track of the ramp section, until the last named gear moves out onto the common receiving track and the ramp is permitted to descend fully and discharge.

The foregoing as well as other objects will become more apparent as this description proceeds, especially when considered in connection with the accompanying drawings illustrating preferred embodiments of the invention, wherein:

FIG. 1 is a top plan view of the portion of a gravity conveyor system embodying the control features of the invention;

FIG. 2 is a view in side elevation, partially broken away, of the control structure; and FIGS. 3 and 4 are, respectively, views in transverse vertical section along lines 3—3 and 4—4 of FIG. 2

Referring to FIG. 1 of the drawings, the improved conveyor 10 in general comprises first and second arcuate incoming supply tracks or chutes 11, 12, respectively, which, as shown in FIG. 2, are inclined for gravitational travel therealong of gears such as the cluster gears G. They are curved in quadrant shaped outline, converging to a discharge zone 13 at which the discharge end of the first track 11 is located directly above the discharge end of the second incoming track 12. Corresponding structural features of the two tracks, to be described, are vertically registered in parallel longitudinal and vertical planes at the discharge zone 13.

The reference numeral 15 generally designates a single common receiving track in longitudinally spaced and aligned relation to the discharge end of the dual conveyor track arrangement. It is downwardly inclined also, and since its structural features correspond to those of the incoming tracks 11 and 12, corresponding reference numerals are employed to designate corresponding details and relationships of the three tracks or chutes 11, 12 and 15.

Such features include the upright side confining walls or panels 17 (FIG. 4) arranged in parallel, laterally spaced relation to one another to accommodate and laterally confine gears G of a given design, so as to insure a proper, jam-free travel of the gears. The walls are curved in conformity with the contour of the respective first and second tracks 11, 12. Pairs of elongated track members, ways or rails 18 parallel the respective side walls 17 in inwardly spaced relation to the latter, being at a desired elevation relative to the walls; and a continuous elongated oil drainage trough 19 of V-shaped cross section is disposed beneath the walls and rails.

This trough is sustained at longitudinally spaced points by suspending straps 20, and at these longitudinally spaced points the track side walls 17, rails 18 and trough suspending straps 20 are rigidly secured together by through bolts 21, with the bolts passing transversely through the rails and with spacer sleeves 22 interposed to maintain correct lateral spacing of the parts.

The bolts 21 also support, in staggered order along the respective tracks 11, 12 and 15, the upright supporting straps 23, which are inturned 90° at 24 and shaped to encircle and support a longitudinal top restraining rod 25. This rod extends continuously along and over the longitudinal center lines of the respective tracks to loosely confine the gears G from above, and primarily to prevent manual deposit of an unqualified gear.

The transfer ramp section of the invention is generally designated 27, and is interposed in the longitudinal space between the discharge end zone 13 of the incoming tracks 11, 12 and the common receiver track continuation 15 thereof. The section 27 may comprise a framework including pairs of forward and rearward upright 28 to which adjacent ends of the vertically spaced incoming tracks 11, 12 and the adjacent ends of the common track extension 15 are suitably secured, as by angle iron brackets 29 or the like. Top-flanged side walls 30 are also bracket-secured to the uprights 28 to confine the gears laterally as they traverse ramp section 27.

A cross plate or stop bar 31 is bolted across the rear face of the rear pair of uprights 28 at an appropriate elevation above the rails 18 of the track 15, for a purpose to be described, and intermediate rails 32 of the ramp section 27, which are actually connecting continuations of the respective rails 18 of the lower incoming track 12 and of the common receiving track continuation 15, are mounted rigidly to the uprights 28, the means for so mounting these rail members 32 being of the same nature as shown in FIG. 4. A rectangular drain pan 34 is supported beneath the transfer or ramp section 27 by suspending bolts 35 and spacer sleeves 36.

The reference numeral 38 designates a gravity transfer ramp of rigid sheet metal construction which has a transverse pivot pin 39 secured to it at its forward end adjacent the incoming tracks 11, 12. Pivot pin 39 is suitably journalled at opposite ends in the forward uprights 28, and laterally outwardly of one thereof the pin 39 has an operating arm 40 secured thereto. This arm is biased in counterclockwise direction by means of a coil tension spring 41, to correspondingly bias the ramp 38 counterclockwise and upwardly. Opposed ends of the spring 41 are connected to an end of the arm 40 and to a lower portion on the upright 28. A set screw 43 adjustably received in a bracket 44 fixed on the same upright limits the counterclockwise movement of the arm 40 and ramp 38 at the upper position of the ramp shown in FIG. 2.

The spacing of the fixed stop bar 31 from the adjacent free delivery end of pivoted ramp 38 is less than the spacing of that end from the fixed rails 32 of the ramp section when a gear is rolling beneath said free end, as shown in FIG. 2.

Elongated slots 46 in the track side walls 17 adjustably receive the rail mounting and strap bolts 21 and thereby afford a measure of longitudinal adjustment of the tracks 11, 12 and 15 in relation to the intervening transfer ramp section 27.

In the operation of the conveyor control described, gears G supplied to the incoming tracks 11, 12 roll or slide along their rails 18 toward the common discharge zone 13 of these track rails. As a gear G moves onto and over the ramp 38, the latter is pivoted downwardly by the gear weight in opposition to the spring 41, and the gear rolls down the ramp 38 onto the common receiving track continuation 15, along whose rails its proceeds to a delivery point. While the ramp 38 is in a downwardly biased position it prevents movement of a gear from lowermost incoming ramp 12 over the rails 32 of transfer section 27 and onto the common track 15.

If a gear is on the transfer section 27 beneath the pivoted ramp 38, at such time as a gear moves onto the latter from the upper incoming track 11, the gear on the ramp is prevented by cross bar 31 from moving onto the track 15, as indicated in FIG. 2, until the gear on the rails 32 of the transfer section is removed and the ramp 38 is permitted to descend.

The system is extremely simple and inexpensive in construction and installation, and its parts are inexpensively modified to accommodate gears G of different size or design by simply substituting different sizes or cross sections of side walls 17, rails 18, confining rods 25, etc., and by variably associating the ramp section 27 with such modified components. Interference and damaging jamming of gears as they converge on the two incoming conveyors 11, 12 is effectively prevented, and any possible temporary stoppage of gear movement is readily and easily corrected by an attendant, who can, among other duties, supervise a number of the conveyor mechanisms of the invention.

The drawings and the foregoing specification constitute a description of the improved gear conveyor system in such full, clear, concise and exact terms as to enable any person skilled in the art to practice the invention, the scope of which is indicated by the appended claims.

What I claim as my invention is:

1. A conveyor system for gears and like cylindrical objects, comprising a pair of incoming tracks along which said objects may roll, said tracks extending uninterruptedly to a common discharge zone, at which said tracks are in vertically spaced relation to one another and have discharge ends in vertical register, a receiving track along which the objects may roll having an incoming end in longitudinally spaced and registered relation to said track discharge ends, and a ramp transfer section interposed between said incoming tracks and said receiving track, comprising a fixed track portion across which the objects may roll freely, said track portion being aligned with and connecting said receiving track with the discharge end of the lower incoming track, a ramp across which the objects may roll freely, said ramp being pivotally mounted above said track portion and adjacent the discharge end of the upper incoming track, said ramp having a free delivery end adjacent the receiving track at which objects rolling on the ramp are delivered to the receiving track, the ramp being swingable upwardly by an object rolling therebeneath on said fixed track portion to permit the object to pass from the latter onto said receiving track, and being swingable downward by an object rolling thereon into an inclined discharge position in which it connects said receiving track with said upper incoming track, and a rigid stop located predeterminedly above said incoming end of said receiving track and adjacent said free delivery end of said ramp, said stop being positioned closer to said ramp delivery end than the latter is to said fixed track portion when an object on said track portion is beneath the ramp delivery end, whereby to prevent rolling discharge of an object therefrom in a position of the ramp predeterminedly above its inclined connecting position.

2. A conveyor system for gears and like cylindrical objects, comprising a pair of arcuate incoming tracks along which said objects may roll, said tracks being inclined for gravity travel of objects thereon and extending uninterruptedly and converging laterally to a common discharge zone at which said tracks have discharge ends in vertically spaced and registered relation to one another, a further receiving track along which the objects may roll having an incoming end in longitudinally spaced and registered relation to said track discharge ends, and a ramp transfer section fixedly interposed between said incoming tracks and said further track, comprising a frame supporting a fixed track portion across which the objects may roll freely, said track portion being aligned with and connecting said further track, a ramp across which said objects may roll freely, said ramp having an end disposed adjacent and at the elevation of the discharge end of the upper incoming track, a pivot member secured on said ramp end and pivotally mounted on said frame, an end of said pivot projecting laterally outward of said frame and having an operating arm thereon, said ramp having a free delivery end adjacent the receiving track at which objects rolling on the ramp are delivered to the receiving track, the ramp being swingable upwardly by an object rolling therebeneath on said fixed track portion to permit the object to pass from the latter onto said receiving track, and being swingable downward by an object rolling thereon into an inclined position in which it connects said further track with said upper incoming track, a spring connected to said arm and resiliently biasing said ramp pivotally upwardly from said last named position, and a rigid stop located predeterminedly above said incoming end of said receiving track and adjacent said free delivery end of said ramp, said stop being positioned closer to said ramp delivery end than the latter is to said fixed track portion when an object on said track portion is beneath the ramp delivery end, whereby to be engaged by and prevent rolling discharge of an object therefrom in a position of the ramp predeterminedly above its inclined connecting position.

References Cited in the file of this patent

UNITED STATES PATENTS

| 1,749,262 | Roark | Mar. 4, 1930 |
| 2,570,923 | Dodge | Oct. 9, 1951 |
| 2,889,023 | Moncrieff | June 2, 1959 |